United States Patent [19]

Baker et al.

[11] Patent Number: 4,532,681
[45] Date of Patent: Aug. 6, 1985

[54] RESTRAINING BELTS

[76] Inventors: Edward H. Baker, 38 Lowther Rd., Barnes, London SW13 9ND, Great Britain; George R. King, 14 Springfield, Nyetimber, Bognor Regis, Sussex, England

[21] Appl. No.: 246,321

[22] Filed: Mar. 23, 1981

[51] Int. Cl.³ .............................................. A44B 11/00
[52] U.S. Cl. .......................................... 403/28; 403/2; 403/272; 40/21 R; 40/625; 24/602
[58] Field of Search ................. 24/602, 201 R; 403/2, 403/32, 28, 267, 266, 268, 272, 265; 40/21 R

[56] References Cited

U.S. PATENT DOCUMENTS

| 3,704,633 | 12/1972 | Iverson | 24/602 |
| 3,779,004 | 12/1973 | Gloekler | 24/602 |
| 3,855,674 | 12/1974 | Thiel | 24/602 |
| 4,014,080 | 3/1977 | Caradec | 24/602 |
| 4,126,919 | 11/1978 | Lassche | 24/602 |

Primary Examiner—Gene Mancene
Assistant Examiner—Wenceslao J. Contreras

[57] ABSTRACT

A safety belt coupling device which comprises components mutually attached by a heat degradable adhesive, such as a low-melting solder. At a predetermined temperature, degradation of the adhesive occurs, which allows the components to separate and thus release the safety belt.

1 Claim, 2 Drawing Figures

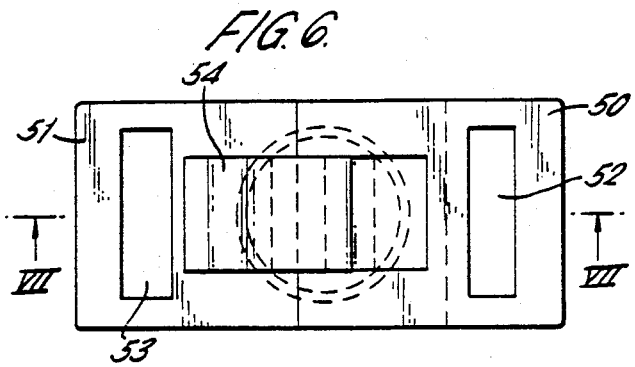
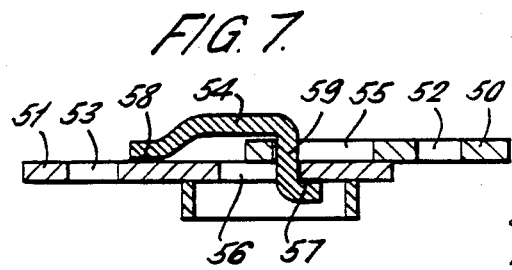
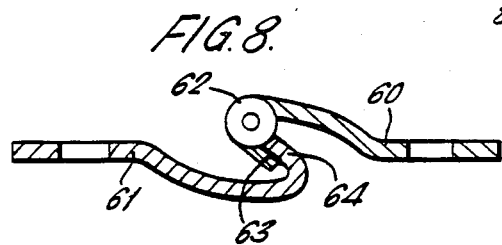
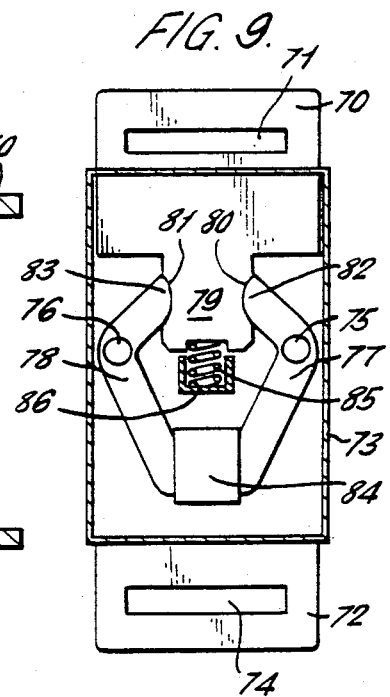

RESTRAINING BELTS

The invention relates to restraining or safety belts, for example seat belts for motor vehicles or aircraft.

A problem associated with seat belts which has given rise to a number of fatalities is that in the event of an accident in which a fire is caused, occupants of a vehicle have been prevented from escaping by that fact that it was not possible to release their seat belts. Thus in some cases a passenger has been killed not by an accident itself, but by being held in a burning vehicle by a seat belt.

According to the invention there is provided a safety belt coupling device for connecting together two parts of a safety belt assembly, the coupling device comprising means for releasing the connection between the two parts of the safety belt assembly when the temperature of the device rises above a predetermined temperature.

The term "safety belt assembly" used herein refers to the safety belt itself, together with anchoring points and clasps. Thus the coupling device may conveniently have one part adapted to engage a female part of a safety belt clasp and a second part adapted to be engaged by the male part of a safety belt clasp. Such a device can be used to adapt existing safety belt assemblies simply by engaging the coupling device between the male and female parts of the existing seat belt clasp.

Alternatively, the coupling device may be used to connect two parts of the belt itself, or to connect a clasp to the belt, or to connect the belt to a mounting, or a mounting to a clasp.

The coupling device preferably comprises at least two parts and means for holding together the parts, the holding means being releasable when the temperature of the device rises above a predetermined temperature. The holding means preferably comprises load bearing means, and non-load bearing for retaining the load bearing means in position. The non-load bearing means is preferably releasable when the temperature of the device rises above a predetermined temperature. Means are provided for urging apart the two or more parts of the coupling device when the holding means is released, and the urging means may comprise a spring.

The predetermined temperature may be in the range 50° C. to 120° C., and preferably in the range 70° C. to 100° C.

The non-load bearing means may be a fusible connection, for example a fusible alloy or alternatively a suitable plastics material.

The invention further provides a restraining or safety belt comprising a coupling device according to the invention.

By way of example, a coupling device according to the invention will now be described with reference to the accompanying drawings in which.

Figure 1:
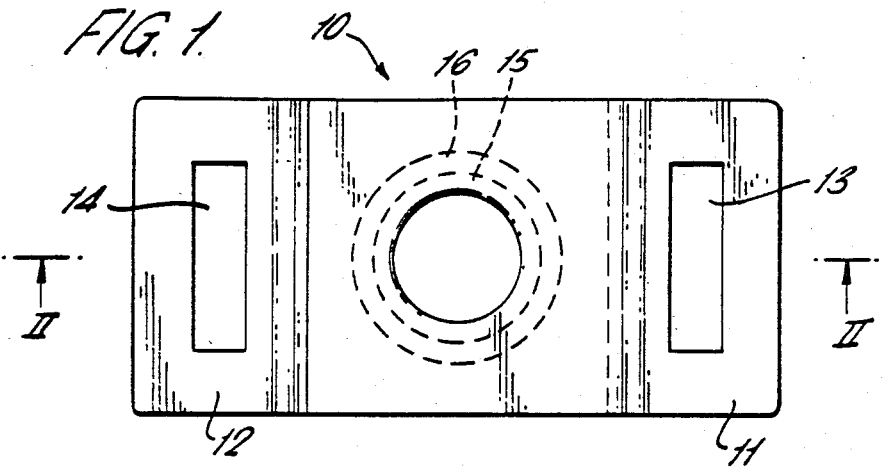
FIG. 1 is a plan view of a first embodiment of a coupling device.
Figure 2:
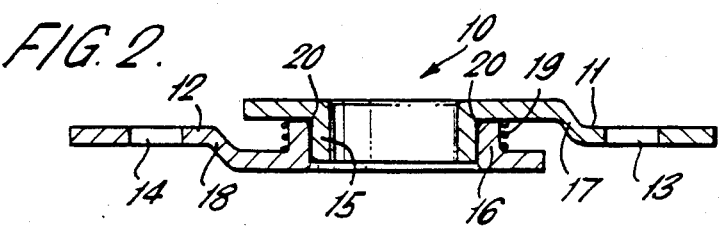
FIG. 2 is a sectional view along the lines II—II of FIG. 1.
Figure 3:
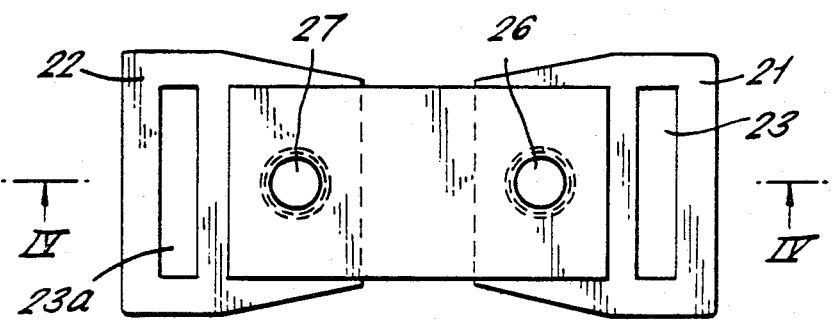
Figure 4:
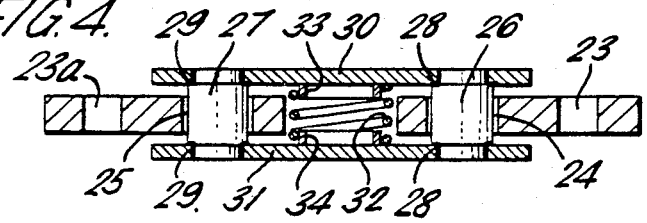

A first embodiment of a coupling device according to the invention is shown in FIGS. 1 and 2. The coupling device, generally indicated at 10 comprises two load bearing parts 11 and 12 each formed with a respective slot 13, 14 for engagement by a safety or restraining belt, for example a vehicle or aircraft seat belt. It will be appreciated that the respective ends of the portions 11 and 12 can be of any desired shape and could, for example, be capable of engaging the female part of a seat belt clasp or of being engaged by the male part of a seat belt clasp. Thus the coupling device 10 if suitably modified can be located in any part of a seat belt assembly.

The portion 11 has annular flange 15 and the portion 12 has an annular flange 16, the annular flange 15 being engagable within the annular flange 16. The portions 11 and 12 of the coupling device have curved portions 17,18 respectively such that when the annular flanges 15 and 16 are mutually engaged, the slots 13 and 14 are co-planar.

A fusible alloy 20, for example Lipowitz alloy (melting point 70° C.), Woods metal (melting point 73° C.) Newtons alloy (melting point 95° C.) or Roses alloy (melting point 100° C.) is used to secure together the flanges 15 and 16 along their adjoining surfaces. It will be appreciated that there are other fusible alloys which could be used, although an alloy compatible with the material of the coupling device, commonly steel, is necessary. Thus the two portions 11 and 12 of the coupling device 10 are secured together until the fusible alloy is melted by a sufficient rise in temperature.

In order to ensure that when the fusible alloy has melted the portions 11 and 12 are separated, a spring 19 is compressed between the portions 11 and 12.

It will be appreciated that the load on the coupling device 10 from the safety belt engaging the slots 13 and 14 acts through the annular flanges 15 and 16 and imposes no tensile load on the fusible alloy 20 holding the portions 11 and 12 together.

The advantage of the invention is that in the case of a crash followed by fire the wearer of the belt could release the belt in the ordinary way to get out of a vehicle or aircraft, but if injured or unconscious the belt would automatically become undone by means of the release of the coupling device as a result of rise in temperature within the vehicle or aircraft. This increases significantly the possibility of rescuers being able to pull the victim to safety. While a fusible alloy has been referred to in relation to invention, it is also possible that a number of adhesives might be suitable for the purpose of allowing thermo release of the coupling device.

We claim:

1. A heat-releasable safety belt coupling for connecting together two parts of a safety belt assembly, comprising a pair of interengaging attachment members for securing to parts of a safety belt assembly, a heat-releasable adhesive connection between said interengaging attachment members, said heat-releasable adhesive connection being capable of degradation at a predetermined temperature to release the attachment member from interengagement, and biasing means to urge the interengaging attachment members to separate on degradation of the heat-releasable adhesive connection.

* * * * *